United States Patent
Blommaert et al.

(10) Patent No.: US 8,291,222 B2
(45) Date of Patent: Oct. 16, 2012

(54) METHOD FOR AGREEING BETWEEN AT LEAST ONE FIRST AND ONE SECOND COMMUNICATION SUBSCRIBER TO SECURITY KEY FOR SECURING COMMUNICATION LINK

(75) Inventors: Marc Blommaert, Temse (BE); Günther Horn, München (DE)

(73) Assignee: Siemens Aktiengesellschaft, Munich (DE)

( * ) Notice: Subject to any disclaimer, the term of this patent is extended or adjusted under 35 U.S.C. 154(b) by 1283 days.

(21) Appl. No.: 11/921,870

(22) PCT Filed: Apr. 10, 2006

(86) PCT No.: PCT/EP2006/061489
§ 371 (c)(1),
(2), (4) Date: Dec. 10, 2007

(87) PCT Pub. No.: WO2006/131414
PCT Pub. Date: Dec. 14, 2006

(65) Prior Publication Data
US 2009/0132806 A1  May 21, 2009

(30) Foreign Application Priority Data
Jun. 10, 2005 (DE) .......................... 10 2005 026 982

(51) Int. Cl.
*H04L 29/06* (2006.01)
(52) U.S. Cl. ........ 713/171; 713/151; 380/248; 380/259; 380/273; 380/278
(58) Field of Classification Search .................. 380/259, 380/260, 278, 277, 248, 273; 713/171, 151
See application file for complete search history.

(56) References Cited

U.S. PATENT DOCUMENTS

| | | | |
|---|---|---|---|
| 5,661,806 A * | 8/1997 | Nevoux et al. ................. | 380/247 |
| 5,991,407 A * | 11/1999 | Murto ............................ | 380/248 |
| 6,347,339 B1 * | 2/2002 | Morris et al. .................. | 709/237 |
| 7,478,167 B2 * | 1/2009 | Ould-Brahim et al. ........ | 709/238 |
| 7,574,600 B2 * | 8/2009 | Smith ............................ | 713/168 |
| 7,908,484 B2 * | 3/2011 | Haukka et al. ................ | 713/181 |
| 7,961,875 B2 * | 6/2011 | Sachs et al. ..................... | 380/29 |
| 2001/0042205 A1 * | 11/2001 | Vanstone et al. .............. | 713/171 |

(Continued)

FOREIGN PATENT DOCUMENTS

EP    1 213 943 A1    6/2002

(Continued)

OTHER PUBLICATIONS

"Generic Authentication Architecture (GAA); Generic Bootstrapping Architecture", Release 6; 3GPP TS 33.220—V6.4.0; 3rd Generation Partnership Project; Mar. 2005; pp. 1-38.

(Continued)

*Primary Examiner* — David García Cervetti
(74) *Attorney, Agent, or Firm* — Staas & Halsey LLP

(57) ABSTRACT

The use of suitable measures in a method for agreeing on a security key between at least one first and one second communication station to secure a communication link is improved so that the security level for the communication is increased and the improved method can be combined with already available methods. A first parameter is determined from an authentication and key derivation protocol. In addition, an additional parameter is sent securely from the second to the first communications station. A security key is then determined from the first parameter and the additional parameter.

20 Claims, 2 Drawing Sheets

U.S. PATENT DOCUMENTS

| | | | |
|---|---|---|---|
| 2002/0077078 A1* | 6/2002 | Antti | 455/410 |
| 2002/0186846 A1* | 12/2002 | Nyberg et al. | 380/273 |
| 2003/0044019 A1* | 3/2003 | Vanstone et al. | 380/277 |
| 2003/0093663 A1* | 5/2003 | Walker | 713/150 |
| 2003/0101345 A1* | 5/2003 | Nyberg | 713/170 |
| 2004/0081321 A1* | 4/2004 | Struik | 380/278 |
| 2005/0015583 A1* | 1/2005 | Sarkkinen et al. | 713/150 |
| 2005/0044365 A1* | 2/2005 | Haukka et al. | 713/171 |
| 2005/0050323 A1* | 3/2005 | Mizrah | 713/168 |
| 2005/0102501 A1 | 5/2005 | Haukka et al. | |
| 2005/0135622 A1* | 6/2005 | Fors et al. | 380/268 |
| 2005/0182936 A1* | 8/2005 | Vanstone et al. | 713/171 |
| 2005/0273609 A1* | 12/2005 | Eronen | 713/171 |
| 2005/0287990 A1* | 12/2005 | Mononen et al. | 455/411 |
| 2006/0093138 A1* | 5/2006 | Durand et al. | 380/44 |
| 2006/0095770 A1* | 5/2006 | Baylis et al. | 713/171 |
| 2006/0182280 A1* | 8/2006 | Laitinen et al. | 380/247 |
| 2006/0251257 A1* | 11/2006 | Haverinen et al. | 380/270 |
| 2006/0282882 A1* | 12/2006 | Bajko et al. | 726/4 |
| 2006/0288407 A1* | 12/2006 | Naslund et al. | 726/9 |
| 2007/0209061 A1* | 9/2007 | Dekeyzer et al. | 726/3 |
| 2009/0013381 A1* | 1/2009 | Torvinen et al. | 726/3 |
| 2010/0174907 A1* | 7/2010 | Semple et al. | 713/169 |
| 2011/0022843 A1* | 1/2011 | Blom et al. | 713/169 |

FOREIGN PATENT DOCUMENTS

JP  2003229845  8/2003

OTHER PUBLICATIONS

"Introducing 2G GBA"; 3GPP TSG SA WG3 Security—SA3#37; S3-050053I; 3rd Generation Partnership Project; Feb. 2005; 12 pp.

"Alternative Approach to 2G GBA"; 3GPP TSG SA WG3 Security—SA3#37, S3-050097; 3rd Generation Partnership Project; Feb. 2005; 1 p.

"3G Security, Security Architecture", Release 6; 3GPP TS 33.102—V6.3.0; 3rd Generation Partnership Project; Dec. 2004; pp. 1-62.

Security Related Network Functions, Release 6; 3GPP TS 43.020—V6.1.0; 3rd Generation Partnership Project; Dec. 2004; pp. 1-11.

S. Jormalainen et al.; "Security in the WTLS"; Computer Science and Engineering; Nov. 1999; 21 pp.

S. Blake-Wilson et al.; "Transport Layer Security (TLS) Extensions"; RFC3546; Jun. 2003; pp. 1-29.

A. Niemi et al.; "Hypertext Transfer Protocol (HTTP) Digest Authentication; Using Authentication and Key Agreement (AKA)"; RFC 3310; Sep. 2002; pp. 1-18.

T. Dierks et al.; "The TLS Protocol", Version 1.0, RFC2246; Jan. 1999; pp. 1-80.

International Search Report for Application No. PCT/EP2006/061489; mailed Sep. 28, 2006.

* cited by examiner

METHOD FOR AGREEING BETWEEN AT LEAST ONE FIRST AND ONE SECOND COMMUNICATION SUBSCRIBER TO SECURITY KEY FOR SECURING COMMUNICATION LINK

CROSS REFERENCE TO RELATED APPLICATIONS

This application is based on and hereby claims priority to German Application No. 10 2005 026 982.6 filed on Jun. 10, 2005, the contents of which are hereby incorporated by reference.

BACKGROUND

Described below are a method and a computer program product for agreeing between at least one first and one second communication subscriber to a security key for the purpose of securing a communication link.

For third generation mobile radiocommunication systems a method is known, from the 3GPP specifications, according to which a short-term security relationship between a user and a communication network device is derived from the long-term security relationship between a user and a network operator. The long-term security relationship is based on a long-term secret cryptographic key, which is stored in a security module of the user, a so-called UMTS-SIM card (technically more accurately: a USIM application on a UICC card), and in the network operator's authentication centre. From this long-term key, a short-term key Ks is derived by the so-called GBA method (GBA=generic bootstrapping architecture), in that messages are exchanged between a terminal device (UE=user equipment), a computational unit in the communication network (BSF=bootstrapping server function) together with a communication network subscriber's system (HSS=home subscriber system). Using a further key derivation function, this short-term key is used as Ks_NAF to secure communications between a user's mobile communication terminal device and another communication network device (NAF=network application function). The GBA method, which is specified in 3G TS 33.220, is based on the UMTS AKA protocol (AKA=authentication and key agreement). This protocol is specified in 3G TS 33.102, and a mandatory requirement of it is the presence of a USIM application at the user end. Here, the UMTS AKA protocol generates in a secure manner session keys CK and IK, each having a length of 128 bits. As laid down in TS 33.220, the short-term key Ks_NAF, used to secure the communications between a user's mobile communication terminal device and a communication network device, is derived from the session keys CK and IK.

The spread of mobile communication terminal devices conforming to the UMTS standard is, however, still far from being as advanced as the spread of mobile communication terminal devices conforming to the GSM standard. Hence too, SIM cards like those used in every GSM mobile radio telephone are significantly more widespread than the UMTS-SIM cars which are as yet still rarely found. However, even for GSM network operators there is a strong interest in providing GSM users with secure links between a mobile communication terminal device and a communication network device. For this reason, the objective of a current standardization project with the name 2G GBA is to define a method of securing a communication which corresponds to the GBA method and which uses, instead of UMTS-SIM cards and the UMTS AKA protocol, either a SIM card or a SIM application on a UICC card and the GSM AKA protocol.

One reason for pursuing this project is the expectation that a future 2G GBA method, to achieve secure communication from a mobile communication terminal device to a communication network device, will not need to establish a new long-term security relationship with the user. Accordingly, the intention would be to avoid the need to distribute new UMTS SIM cards to the users, something which always has high associated costs for the network operator. The SIM cards or SIM applications on the UICC card, already available to the users, should thus continue to be used, so that a relationship which already exists between a user and a network operator can be used.

One problem with this is that the GSM AKA protocol offers substantially lower security than the UMTS AKA protocol. Apart from this, the session keys generated by the GSM AKA protocol are for many purposes too short (maximum 64 bits). Furthermore, the session keys are used by insecure algorithms, such as for example the GSM encryption algorithms A5/1 and A5/2. There is therefore a danger that a hacker can find out this session key, and the security of the 2G GBA method could thereby be completely compromised.

SUMMARY

Hence, an aspect is to enhance a GBA method, known from third generation mobile radiocommunication systems, by the least possible modifications, making use of the GSM AKA protocol and the SIM, in such a way that the level of security for communication between a mobile communication terminal device and a communication network device is further increased compared to the GSM AKA protocol.

A further aspect is to agree on a security key by at least one first and one second communication subscriber, for the purpose of securing a communication link, in such a way that the security level for the communication is increased, and in doing this the improved method is based on methods which already exist.

As described below, in a method for agreeing between at least one first and one second communication subscriber a security key, for use in securing a communication link, at least one first parameter is determined from an authentication and key derivation protocol. In addition to this, the second communication subscriber transmits to the first communication subscriber an additional parameter, in a confidential manner such that the confidentiality of the transmission is ensured independently of the authentication and key derivation protocol. Finally, a security key is determined from the first parameter and the additional parameter.

In accordance with one embodiment, the additional parameter is a random number or a concatenation of a random number with additional data.

In accordance with a further embodiment, the random number contained in the additional parameter is a component of the authentication and key derivation protocol from which the first parameter is determined.

In accordance with a further embodiment, the first communication subscriber takes the form of a mobile communication terminal device, and the second communication subscriber is a communication network device.

In accordance with an advantageous development, the second communication subscriber authenticates itself to the first communication subscriber via a certificate with a public key.

In accordance with a further advantageous development, the first communication subscriber authenticates itself to the second communication subscriber via the authentication and key derivation protocol from which the first parameter is derived.

In accordance with a further advantageous development, the first communication subscriber authenticates itself to the second communication subscriber with the help of a third communication subscriber which specializes in the administration of the users of the communication network.

In accordance with a preferred embodiment variant, the first communication subscriber takes the form of a user equipment conforming to the mobile radiocommunication specification as per 3GPP, the second communication subscriber is in the form of a bootstrapping server function conforming to the mobile radiocommunication specification 3G TS 33.220, and the third communication subscriber is in the form of a home subscriber system conforming to the mobile radiocommunication specification 3G TS 33.220.

In accordance with another preferred embodiment variant, the Transport Layer Security Protocol according to the specification RFC 2246, or with enhancements according to the specification RFC 3546, is used as the security protocol for the confidential transmission of the additional parameter.

In accordance with another preferred embodiment variant, the authentication and key derivation protocol for the determination of the first parameter is implemented in conformity with the mobile radiocommunication specification 3G TS 43.020.

In accordance with another embodiment, the parameters of the authentication and key derivation protocol, for the determination of the first parameter, are communicated in a suitable form in fields which are defined in accordance with the specification RFC 3310 for the HTTP Digest AKA (Authentication and Key Agreement).

According to another embodiment, the parameters are transmitted in accordance with the specification TS 33.220.

In accordance with another embodiment, the additional parameter is communicated in a suitable form in fields which are defined in accordance with the specification RFC 3310 for the HTTP Digest AKA (Authentication and Key Agreement).

According to a further embodiment, the fields include "RAND" and "Server Specific Data".

In the course of the execution of the computer program product, for agreeing a security key between at least one first and one second communication subscriber for the purpose of securing a communication link, at least one first parameter is determined from an authentication and key derivation protocol. In addition to this, the second communication subscriber transmits to the first communication subscriber an additional parameter, in a confidential manner such that the confidentiality of the transmission is ensured independently of the authentication and key agreement protocol. From the first parameter and the additional parameter, a security key is determined when the control program is executed in the program execution control device.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
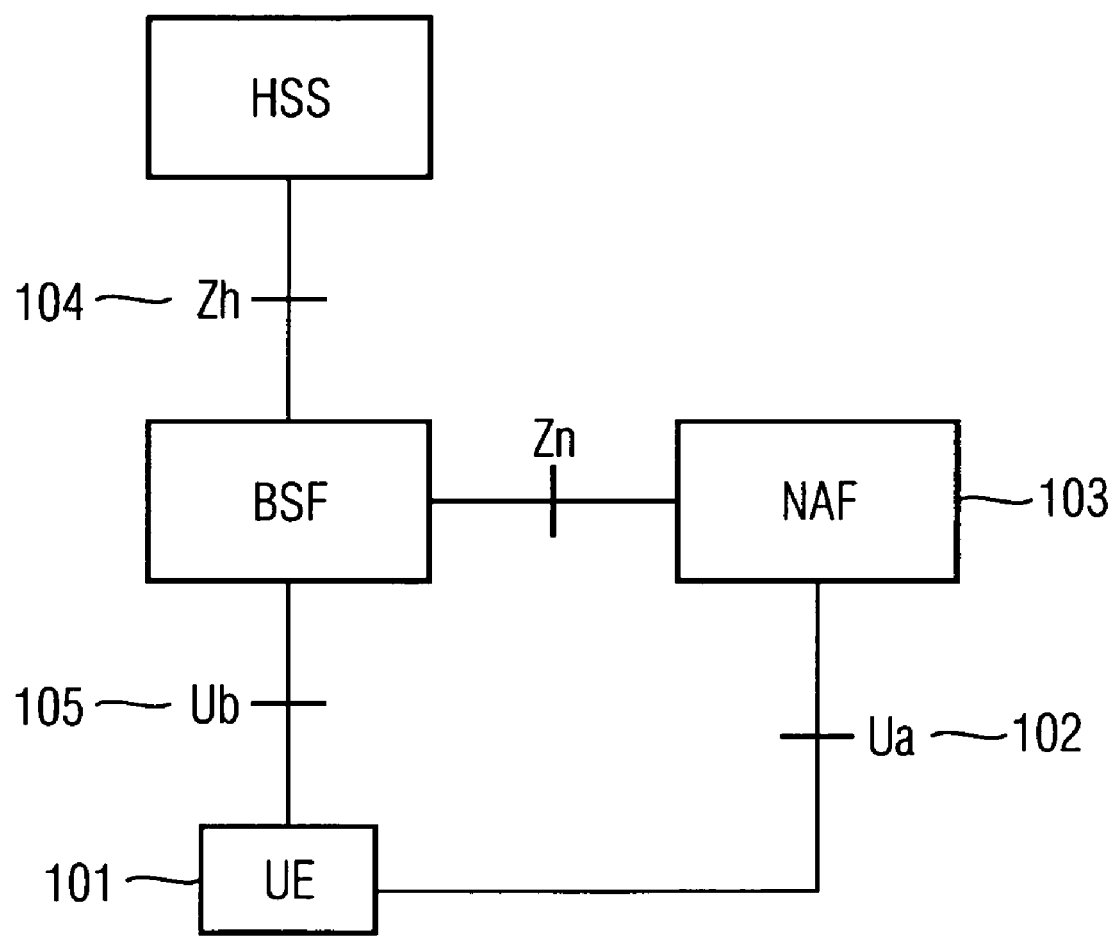
FIG. 1 is a block diagram of a network model of the entities which are involved in a bootstrapping method, and the reference points used between the entities.
Figure 2:
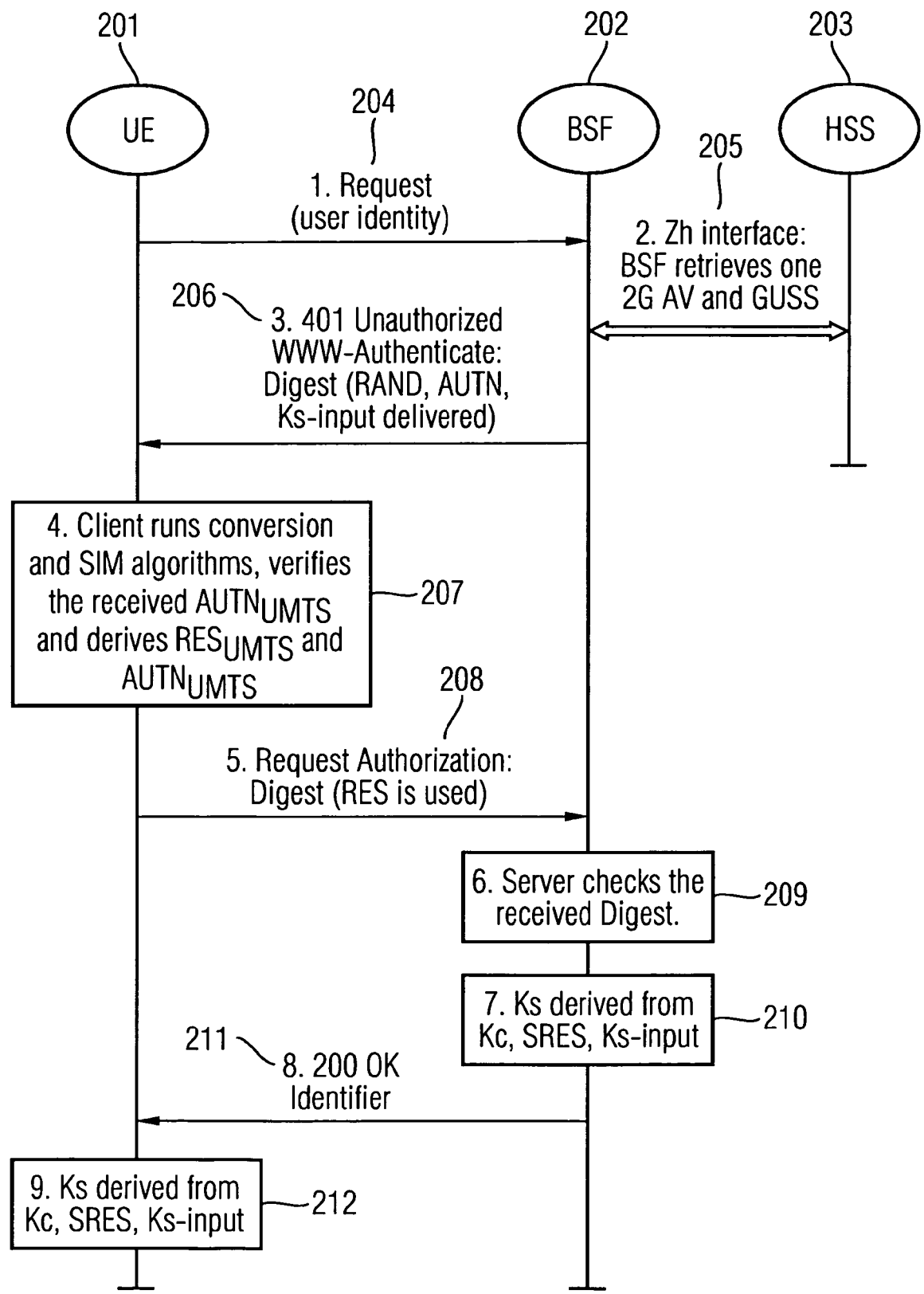
FIG. 2 is a processing sequence diagram of a bootstrapping method with 2G authentication vectors.

Reference will now be made in detail to the preferred embodiments, examples of which are illustrated in the accompanying drawings, wherein like reference numerals refer to like elements throughout.

Before communication can start between the user equipment (UE) 101 and the network application function (NAF) 103, the UE and the NAF must first reach agreement on whether they wish to proceed in accordance with the generic bootstrapping architecture (GBA). In a first step, the UE 101 starts the communication with the NAF 103 via a reference point Ua 102 with no parameters relevant to the GBA. If the NAF requires the use of keys which are obtained by a GBA method, but the request from the UE contains no parameters relevant to the GBA, the NAF replies with a bootstrapping initiation message.

If the UE 101 wishes to interact with a NAF 103 and knows that the process will be in accordance with the bootstrapping procedure, it should first undertake a bootstrapping authentication. Otherwise, the UE should only undertake a bootstrapping authentication if has received from the NAF a message about a requirement to initiate bootstrapping or a request to renegotiate the bootstrapping, or if the period of validity of the key Ks has expired in the UE.

For this purpose, the UE 201 transmits an HTTPS request 204 via the reference point Ub 105 (see FIG. 1) to the bootstrapping server function (BSF) 202. This initiating HTTPS request and all further communications between the UE and the BSF are transmitted via a protected transport layer security (TLS) channel. When this TLS channel is being set up, the UE authenticates the BSF using a certificate provided by the BSF. In doing this, the UE checks whether the "REALM" attribute contains the same fully qualified domain name (FQDN) for the BSF as that which is contained in the certificate provided by the BSF.

Via the reference point Zh (see FIG. 1, 104), the BSF 202 requests authentication vectors and GBA user security settings (GUSS) 205 from the home subscriber system (HSS) 203. The HSS transmits back via the reference point Zh the complete set of GBA user security settings (GUSS) and one 2G authentication vector (AV=RAND, SRES, Kc) 205. From the AV type, the BSF knows that the UE is equipped with a 2G SIM. The BSF converts the 2G authentication vector (RAND, Kc, SRES) to the parameters $RAND_{UMTS}$, $RES_{UMTS}$ and $AUTN_{UMTS}$ of a pseudo-3G authentication vector. Doing this does not require a conversion to the session keys CK and IK of a 3G authentication vector):

$RAND_{UMTS}$=RAND $RES_{UMTS}$=KDF (Key, "3GPP–GBA–RES"∥SRES), truncated to 128 bits $AUTN_{UMTS}$=KDF(Key, "3GPP–GBA–AUTN"∥RAND), truncated to 128 bits, where Key=Kc∥Kc∥RAND and KDF is the key derivation function specified in Annex B of TS 33.220. "Truncated to 128 bits" means here that of the 256 output bits from the KDF, the 128 bits numbered 0 to 127 are selected.

The BSF must also select a random number "Ks-input" and set the server specific data=Ks-input in the "aka-nonce" field of HTTP Digest AKA.

In order to request the UE to authenticate itself, the BSF forwards on to the UE the server specific data (i.e. Ks-input), $RAND_{UMTS}$ and $AUTN_{UMTS}$ in a "401" message 206.

The UE extracts RAND from the message and calculates the corresponding Kc and SRES values 207. Following this, the UE calculates from these values the pseudo-3G authentication vector parameters $RAND_{UMTS}$, $RES_{UMTS}$ and $AUTN_{UMTS}$. The UE compares the calculated $AUTN_{UMTS}$ with the corresponding value which has been obtained from the BSF. The UE will terminate this procedure if the values do not agree.

The UE transmits a further HTTP request with a Digest AKA reply to the BSF 208, in doing which $RES_{UMTS}$ is used as the password.

The BSF authenticates the UE by verifying the Digest AKA reply 209. If this authentication fails, the BSF should not use this authentication vector in any further communication.

The BSF generates key material Ks 210 by calculating Ks=KDF (Key∥Ks-input, "3GPP–GBA–Ks"∥SRES). The bootstrapping transaction identifier (B-TID) value should be generated in the NAI format, by referring to a base-64-encoded $RAND_{UMTS}$ value and the BSF server name, for example Base64encode $(RAND_{UMTS})$@BSF_Server_Domain_Name.

The BSF transmits a 200 OK message together with the B-TID to the UE 211, to confirm the success of the authentication. In addition, the BSF communicates the validity period of the key Ks in the 200 OK message.

The UE generates the key material Ks in the same manner as does the BSF 212.

Both the UE and the BSF use the key material Ks for the purpose of deriving the key material Ks_NAF for protecting the reference point Ua. Ks_NAF is calculated from Ks_NAF=KDF (Ks, key derivation parameters), where KDF is the key derivation function specified in Annex B and the key derivation parameters include the user IMPI, the NAF_ID and the RAND_UMTS. The NAF_ID contains the complete DNS name of the NAF. In order to ensure consistent key derivation on the basis of the NAF name in the UE and the BSF, at least one of the following three prerequisites should be satisfied:

1. In DNS, the NAF is known under only one domain name (FQDN) so, for example there should not be two different domain names which refer to the IP address of the NAF. This is achieved by administrative means.
2. Each DNS entry for the NAF refers to a different IP address. The NAF responds to all these IP addresses. Each IP address is linked to the corresponding FQDN by configuration of the NAF. From the IP address, the NAF can recognize which FDQN should be used for the key derivation.
3. The reference point Ua uses a protocol which communicates the host name to the NAF. This forces the NAF to check the validity of the host name in order to use this name in all communications with the UE, if it is appropriate, and to communicate this name to the BSF in order to ensure the correct derivation of the key material Ks_NAF.

The UE and the BSF should store the key Ks together with its associated B-TID until the period of validity of the key Ks has expired or until the key Ks is renewed.

When the key Ks_NAF is available for the corresponding key derivation parameter NAF_ID, the UE and the NAF can start a secure communication via the reference point Ua.

To date, two proposed solutions for such a 2G GBA method are known, these having been presented to the relevant standardization group 3GPP SA3 in the contributions S3-050053 from Nokia and S3-050097 from Qualcomm.

Contribution S3-050053 from Nokia solves the problem of the excessively short GSM session key Kc by using for each instance of the 2G GBA method several instances of the GSM AKA protocol, the so-called GSM triplets. In this way, one obtains several session keys Kc which are then combined into one short-term key of sufficient length. Here, the GSM AKA protocol is used for authenticating the user to the network, for authenticating the network to the user and for the agreement of session keys. The HTTP Digest AKA protocol conforming to the specification RFC 3310 is used as the carrier protocol for the GSM AKA protocol, with the parameters of the GSM AKA protocol being suitably modified by conversion functions.

Contribution S3-050097 from Qualcomm uses the Diffie Hellman method for the agreement of session keys. Authentication of the network to the user is based on the use of certificates and a digital signature using parameters of the Diffie Hellman method. The GSM AKA protocol is only used for authenticating the user to the network, with the GSM key Kc being used to form a message authentication code (MAC) using parameters of the Diffie Hellman method.

By contrast with these, the problem, described above is solved by an exemplary embodiment as follows:

The method uses, as the carrier protocol for the GSM AKA protocol, the HTTP Digest AKA protocol in accordance with specification RFC 3310, with the parameters of the GSM AKA protocol modified by suitable conversion functions. Here, only one instance of the GSM AKA protocol is used per 2G GBA instance. In addition, a transport layer security (TLS) link between the mobile communication terminal device and the BSF is set up in accordance with the specification RFC 2246. With this TLS link, strong encryption is activated. The BSF is authenticated to the mobile communication terminal device on the basis of certificates when this TLS link is set up. However, the mobile communication terminal device is not authenticated when the TLS link is set up. Authentication of the mobile communication terminal device to the BSF is effected by the use of GSM AKA embedded in the HTTP Digest AKA protocol.

An advantageous effect which results from this is that the security of the short-term key in accordance with the present method is based both on the security of GSM and also on the security of TLS. It can only be compromised if both the GSM and TLS methods are compromised in the environment in which they are used, or such a serious attack on GSM becomes possible that the GSM method can be compromised during the running of the bootstrapping method described here.

Inputs to the calculation of the short-term key by the key derivation function are the parameters Kc and SRES (signed response), obtained from the GSM protocol, and random numbers which are transmitted confidentially from the BSF to the mobile communication device as part of the HTTP Digest AKA protocol, protected by the TLS encryption. These random numbers can be transmitted, for example, in the "AKA-NONCE" field in accordance with the specification RFC 3310, both as a Challenge RAND and also as part of the "Server Specific Data".

The proposed measures of the method described above result in the following particular advantages:

In order to find the short-term key which has been derived, a hacker must find out both the GSM parameters Kc and SRES, and also the random numbers transmitted confidentially over the TLS, that is they must make an attack on both the GSM method and also the use of the TLS method. This substantially increases the security against attacks.

The effective length of the short-term key which is derived can be significantly increased compared to the proposal in S3-050053 by the use of random numbers Ks-input as part of the additional parameter, a parameter which is not a component of GSM AKA. In this way, the security against hacking attacks is yet further increased.

It is only necessary to use a single instance of GSM AKA per 2G GBA instance. This leads to a significant reduction in the load on the GSM authentication centre compared to the proposal in S3-050053.

The security of the proposal in S3-050053 generally requires reliable prevention of the possibility that an attacker ever reuses, in another context, GSM triplets which have been used in 2G GBA. This would enable the parameters Kc and SRES to be determined, for example by an attack on an A5/1 or A5/2 encryption algorithm, and thereby also the short-term key of the 2G GBA. But it will in practice only be possible with difficulty to realize this. On the other hand, an attack on the method described here would only be possible if the attacker could determine the GSM parameters Kc and SRES during a protocol run of 2G GBA. However, according to present-day understanding this is possible for a period of a few seconds and only for the A5/2 algorithm, but this is no longer permitted on terminal devices which will support 2G GBA. For this reason, the proposed method is not only significantly more practicable than the proposal in S3-050053 but it also significantly increases the security.

A further advantage compared to the proposal in S3-050097 is that the security of the method is based on several independent factors. In particular, the UE can also authenticate the BSF by comparing the calculated and received $AUTN_{UMTS}$. By contrast, the security of the proposal in accordance with Qualcomm is based solely on the secure authentication of BSF based on a certificate.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for agreeing between at least one first and one second communication subscriber to a security key used in securing a communication link, comprising:
   determining at least one first parameter from an authentication and key derivation protocol;
   transmitting, from the second communication subscriber to the first communication subscriber, an additional parameter using a confidentiality protocol to ensure confidentiality of transmission of the additional parameter independently of the authentication and key derivation protocol;
   determining the security key from the first parameter and the additional parameter.

2. The method as claimed in claim 1, wherein the additional parameter can be subdivided into at least first and second parts.

3. The method as claimed in claim 2, wherein the additional parameter is one of a random number and concatenation of the random number with other data.

4. The method as claimed in claim 3, wherein a part of the random number is a component of the authentication and key derivation protocol, from which the first parameter is determined.

5. The method as claimed in claim 4, wherein the first communication subscriber is implemented as a mobile communication terminal device and the second communication subscriber is implemented as a communication network device.

6. The method as claimed in claim 5, wherein the second communication subscriber authenticates itself to the first communication subscriber via a certificate with a public key.

7. The method as claimed in claim 6, wherein the first communication subscriber authenticates itself to the second communication subscriber via the authentication and key derivation protocol, from which the first parameter is derived.

8. The method as claimed in claim 7, wherein the first communication subscriber authenticates itself to the second communication subscriber via a third communication subscriber which specializes in administration of users.

9. The method as claimed in claim 8,
   wherein the first communication subscriber is implemented as user equipment operating according to Third Generation Partnership Project mobile radiocommunication specifications,
   wherein the second communication subscriber is implemented as a bootstrapping server function according to mobile radiocommunication specification 3G TS 33.220, and
   wherein the third communication subscriber is implemented as a home subscriber server according to the mobile radiocommunication specification 3G TS 33.220.

10. The method as claimed in claim 9, wherein the transport layer security protocol according to the specification RFC 2246 or with enhancements according to the specification RFC 3546 is used as the security protocol for the confidential transmission of the additional parameter.

11. The method as claimed in claim 10, wherein the authentication and key derivations protocol for the determination of the first parameter is implemented in accordance with the mobile radiocommunication specification 3G TS 43.020.

12. The method as claimed in claim 11, wherein said determining of the first parameter uses parameters of the authentication and key derivation protocol communicated in a suitable form in fields which are defined in accordance with specification RFC 3310 for a Hypertext Transfer Protocol Digest Authentication and Key Agreement.

13. The method as claimed in claim 11, wherein the transmission of the parameters is executed in accordance with the specification TS 33.220.

14. The method as claimed in claim 13, wherein the additional parameter is communicated in a suitable form in fields which are defined in accordance with specification RFC 3310 for a Hypertext Transfer Protocol Digest Authentication and Key Agreement.

15. The method as claimed in claim 13, wherein the at least first and second parts of the additional parameter are transmitted in different fields.

16. The method as claimed in claim 15, wherein the fields include RAND and Server Specific Data.

17. The method as claimed in claim 16, wherein the key derivation protocol has a key derivation function with hashkey and hashdata as input parameters.

18. The method as claimed in claim 16, wherein the first part of the additional parameter goes into hashkey and the second part of the additional parameter into hashdata.

19. The method as claimed in claim 16, wherein the first part of the additional parameter goes into hashkey and hashdata, and the second part of the additional parameter goes into hashkey.

20. At least one non-transitory computer readable medium embodying a computer program that, when loaded into a working storage of and executed by at least one program execution control device, causes the at least one program execution control device to perform a method of agreeing between at least one first and one second communication subscriber to a security key used in securing a communication link, said method comprising:

determining at least one first parameter from an authentication and key derivation protocol;

transmitting, from the second communication subscriber to the first communication subscriber, an additional parameter using a confidentiality protocol to ensure confidentiality of the transmission independently of the authentication and key derivation protocol;

determining the security key from the first parameter and the additional parameter.

\* \* \* \* \*